United States Patent
Deck et al.

(10) Patent No.: US 11,164,396 B2
(45) Date of Patent: Nov. 2, 2021

(54) SERVICING SYSTEM WITH SNAPSHOT FUNCTION

(71) Applicant: Dell Products L.P., Round Rock, TX (US)

(72) Inventors: Richard C. Deck, Austin, TX (US); Scott C. Lauffer, Austin, TX (US); James H. Leftwich, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/524,980

(22) Filed: Jul. 29, 2019

(65) Prior Publication Data

US 2021/0035373 A1    Feb. 4, 2021

(51) Int. Cl.
*G06T 19/00* (2011.01)
*G06T 19/20* (2011.01)
*G06F 30/17* (2020.01)

(52) U.S. Cl.
CPC .............. *G06T 19/20* (2013.01); *G06F 30/17* (2020.01); *G06T 19/006* (2013.01)

(58) Field of Classification Search
CPC ......... G06F 30/17; G06T 13/00; G06T 13/20; G06T 19/00; G06T 19/20; G06T 19/006
See application file for complete search history.

(56) References Cited

U.S. PATENT DOCUMENTS

| | | | | |
|---|---|---|---|---|
| 2014/0146038 | A1* | 5/2014 | Kangas | G06T 19/20 345/419 |
| 2015/0084989 | A1* | 3/2015 | Laughlin | G06T 19/006 345/633 |
| 2015/0138233 | A1* | 5/2015 | Frushour | G06T 3/00 345/633 |
| 2018/0150070 | A1* | 5/2018 | Johnson | G06T 7/001 |
| 2018/0204383 | A1* | 7/2018 | Licht | G06Q 20/18 |
| 2020/0026257 | A1* | 1/2020 | Dalal | G06K 9/00718 |
| 2020/0034622 | A1* | 1/2020 | Thakurta | G05B 15/02 |

OTHER PUBLICATIONS

Khuong et al., "The Effectiveness of an AR-based Context-Aware Assembly Support System in Object Assembly", IEEE Virtual Reality 2014, Minneapolis, MN, 2014 (Year: 2014).*

* cited by examiner

*Primary Examiner* — Diane M Wills
(74) *Attorney, Agent, or Firm* — Terrile, Cannatti & Chambers; Stephen A. Terrile

(57) ABSTRACT

A system, method, and computer-readable medium for servicing a system, comprising: displaying animated content relative to the system; determining a snapshot function has been initiated; sending a request to a user of an augmented reality device with a camera to move the augmented reality device relative to the system; capturing information about components in the system and a configuration of the system; generating a three dimensional (3D) model of the system based on the captured information; and displaying a composite view of the model or an overlay based on the model and animated content related to a component.

12 Claims, 3 Drawing Sheets

SERVICING SYSTEM WITH SNAPSHOT FUNCTION

BACKGROUND OF THE INVENTION

Field of the Invention

The present invention relates to information handling systems. More specifically, embodiments of the invention relate to using an augmented reality system for servicing a system for presenting and controlling animated content relative to the system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

A system, method, and computer-readable medium are disclosed for servicing a system. In certain embodiments, a servicing operation includes displaying animated content relative to the system; determining a snapshot function has been initiated; sending a request to a user of an augmented reality device with a camera to move the augmented reality device relative to the system; capturing information about components in the system and a configuration of the system; generating a three dimensional (3D) model of the system based on the captured information; and displaying a composite view of the model or an overlay based on the model and animated content related to a component. In certain embodiments, servicing the system includes displaying animated content related to removal steps for the set of components, installation steps for reinstalling the removed components or installing replacement components, or testing or other servicing actions. A user or a process control module can initiate the snapshot function. A copy of the 3D model is stored in a snapshot repository. In certain embodiments, a first copy of the 3D model at a first state is stored in the snapshot repository and a second copy of the 3D model at a second state after an action is completed is stored in the repository.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
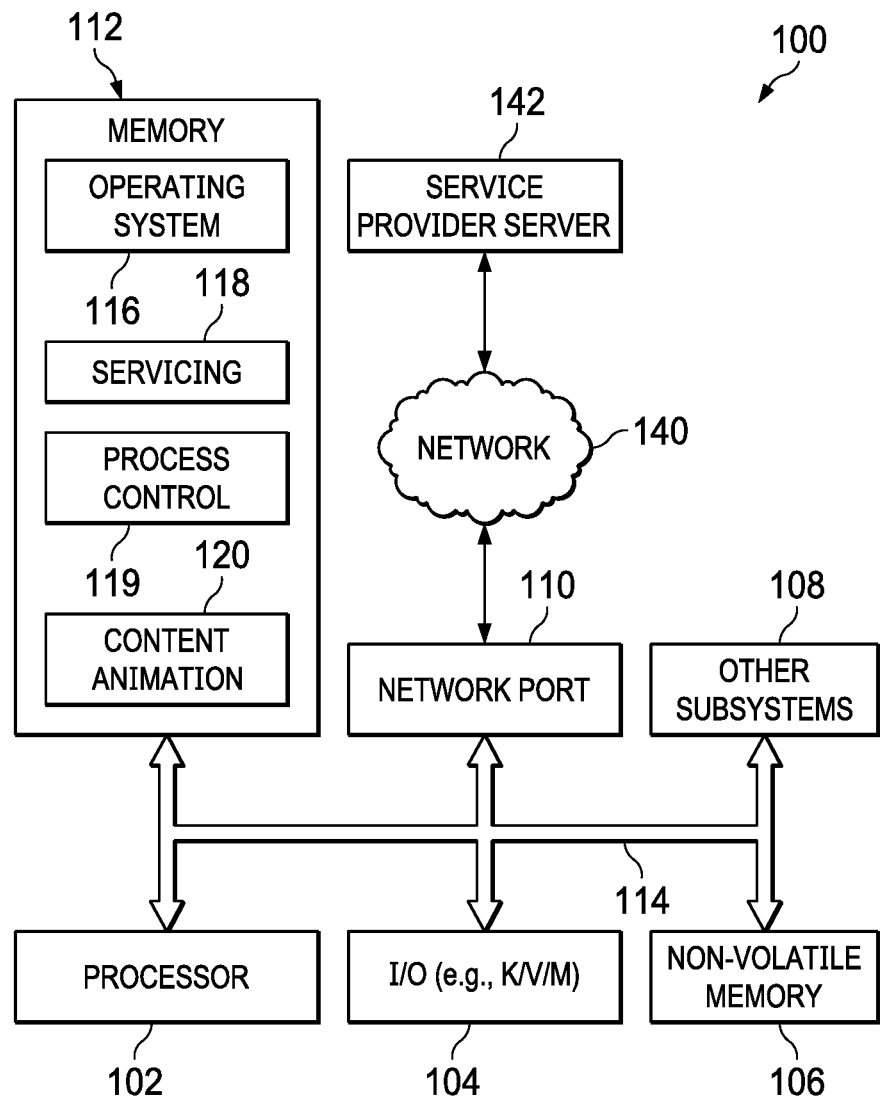
FIG. 1 shows a general illustration of components of an information handling system as implemented in the system and method of the present invention.

It is known to present animated content to show a process. Ideally, when a user is using animated content to understand how to remove or install components in a system, the animated content matches the components and system, and the user is able to understand the content. However, when animated content is presented to show a process, the animated content is usually generic and is shown from one viewpoint. This can be problematic, as there are often complications with servicing a system, such as variations between what components are displayed in the animated content and the actual system or the view point of a user watching the animated content might not match the viewpoint presented in the animated content. Furthermore, the presentation of generic content does not take into account the skill level of the user servicing the system. If the user is lacking a tool needed to complete an action, the user must pause the animated content to get the tool. If the user is holding an animated content display device, the user might set down the device to verify components in the system or to find the tool. When the user is ready to resume the process and picks up the device, the user needs to position and reorient the device relative to the system and ensure the animated content is displayed at the correct frame set. Also, the system may be configured such that a component is not oriented the same as the animated content or there are other components that interfere with accessing the desired component. Consequently, a user viewing animated content might need to pause the animated content or change position or orientation to view the system from a different angle to understand how to best complete a task. The user may pause the animated content or may try to reposition quickly to avoid further delays. In these scenarios, servicing the system is delayed until the user is able to view animated content that corresponds to the system being serviced and from a viewpoint that corresponds to a viewpoint of the user.

A system, method, and computer-readable medium are disclosed for servicing a system. In certain embodiments, a servicing operation includes displaying animated content relative to the system; determining a snapshot function has been initiated; sending a request to a user of an augmented reality device with a camera to move the augmented reality device relative to the system; capturing information about components in the system and a configuration of the system; generating a 3D model of the system based on the captured information; and displaying a composite view of the model or an overlay based on the model and animated content related to a component. In certain embodiments, servicing the system includes displaying animated content related to removal steps for the set of components, installation steps for reinstalling the removed components or installing replacement components, or testing or other servicing actions. A user or a process control module can initiate the snapshot function. A copy of the 3D model is stored in a snapshot repository. In certain embodiments, a first copy of the 3D model at a first state is stored in the snapshot repository and a second copy of the 3D model at a second state after an action is completed is stored in the repository.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise at least one of a servicing module 118, a content animation module 119 and a snapshot module 120.

A service module 119 performs a servicing operation. In certain embodiments, the service module receives component identification information from an AR system, identifies a system based on the component identification information, retrieves performance data for the system, compares the performance data with a tested performance data, and returns a set of options for servicing the system to the AR system. In certain embodiments, the service module determines if the actual performance is above a threshold, below a threshold, or otherwise outside a range of tested performance data. In certain embodiments, if there are components that need to be replaced, or there are missing or improperly installed components, or the system is not in a design configuration, the service module identifies a list of servicing options including one or more of a set of replacement components and a design configuration, sends instructions for servicing the system to the AR system. The instructions for servicing the system include animated content. A system visualization module retrieves or generates a system model that contains a component model for each component identified by the AR device, and the AR device displays a composite view of the system model or an overlay based on the system model and animated content associated with a servicing operation.

A content animation module 119 performs a content animation operation. In certain embodiments, the content animation module receives servicing information, identifies a component based on the servicing information, and generates or retrieves animated content related to the installation or removal of the component. In certain embodiments, the content animation module generates content based on a position or orientation of an augmented reality device.

The process control module 120 performs a process control operation. The process control module monitors the state of the system during a servicing operation. The process control module also monitors the position and orientation of the augmented reality device relative to the system. In certain embodiments, if the process control module determines an action required during a servicing operation will require more time for a user to complete, the process control module pauses the animated content. In certain embodiments, if the process control module determines an action required during a servicing operation will require the user to view the system from another angle to understand how to complete a task, the process control module communicates with the animated content module to deliver animated content that can be rotated, zoomed in, or otherwise modified for better understanding.

Figure 2:
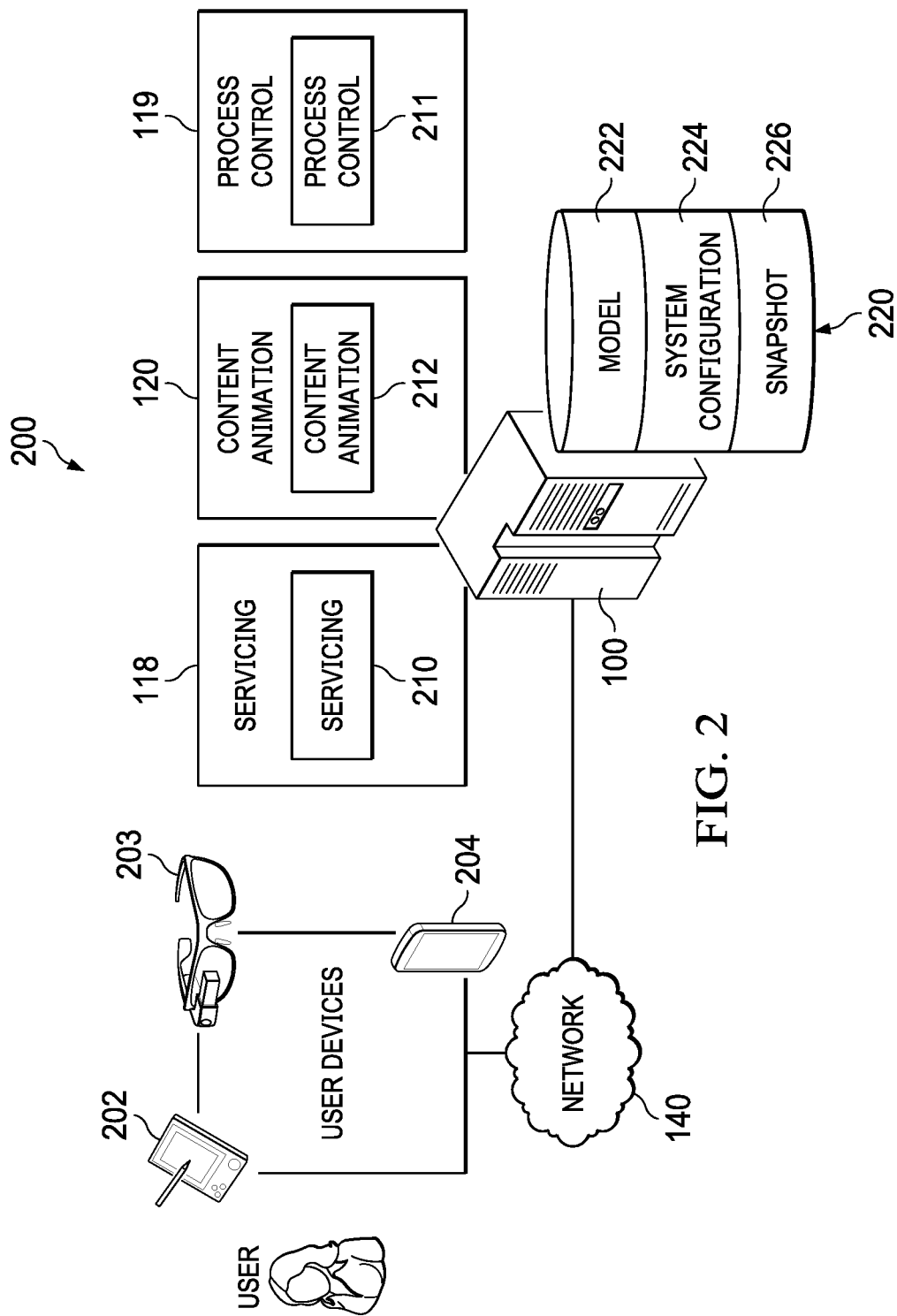
FIG. 2 shows a block diagram of a content animation environment.

FIG. 2 is a block diagram of a servicing environment 200 implemented in accordance with an embodiment of the invention. The servicing environment 200 includes a servicing system 210, a process control system 211 and a content animation system 212. In various embodiments, one or more of a servicing system 210, a process control system 211 and a content animation system 212 executes on a hardware processor 102 of an information handling system 100.

As used herein, an augmented reality (AR) system refers to an information handling system such as a tablet computer, a personal digital assistant (PDA) 202, a smart phone 204, a mobile telephone, smart goggles 203, or other device with a camera or scanning device, a screen or other display, and that is capable of communicating and processing data. In various embodiments, the AR system is configured to present a validation system user interface. In various embodiments, the AR system receives commands from a user to capture system and component information, communicates with the validation system, the service system and the upgrade system, and receives models, overlays and images of the system through the use of a network 140. In certain embodiments, the network 140 may be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention.

A servicing system 210 receives an instruction associated with servicing a system. In certain embodiments, the instruction includes instructions for executing a process associated with one or more of removing, testing and installing components in the system. The servicing system communicates with an augmented reality device to determine components and a configuration of the system, communicates with an animated content system to retrieve animated content related to the components and configuration of the system, and communicates with a user device to display a composite view of the animated content relative to a model of the system in the present state. In certain embodiments, a mobile computing device with a camera scans the system and communicates the information to the servicing system, and the servicing system determines component information based on the scanned information. In certain embodiments, component information is communicated to the servicing system and the servicing system determines what components are in the system in the present state. In certain embodiments, component information is obtained by a camera function in Ar systems such as PDA 202, augmented reality goggles 203 or portable computing device 204. The component information is stored in a model repository 222.

In certain embodiments, configuration information for a system is sent to the servicing system. System configuration information comprises information associated with a set of components in a design configuration that has been tested to operate within a range of performance parameters. The configuration information for the system is stored in a configuration repository 224. In certain embodiments, system configuration information comprises an overlay generated for that system based on the component modeling information in a design configuration selected from the design configurations previously tested and stored in the configuration repository.

In a servicing process for a system, a user device is presented with a set of animated content for installing, testing or removing components in the system. In certain embodiments, a set of components and a set of actions to be completed are identified. During the course of servicing the system, a snapshot function can be initiated. A snapshot function can be initiated by a user activating a button or by the process control model determining the user needs more time or assistance. In some embodiments, the process control system 211 determines a snapshot function has been initiated relative to an action.

When a snapshot function is initiated, the process control system captures information about the present state of the systems. In certain embodiments, when the snapshot function is initiated, the process control module instructs the user to move the device around the system and the camera captures component and system information about the system. The process control system retrieves component models from a component model repository and builds a 3D model of the system from the user's perspective. A copy of the 3D model is stored in a snapshot repository 226. A 3D model stored in the snapshot repository can be compared with a 3D model of the system in a design configuration or other 3D models stored in the snapshot repository to determine what changes have been made to the system.

Figure 3:
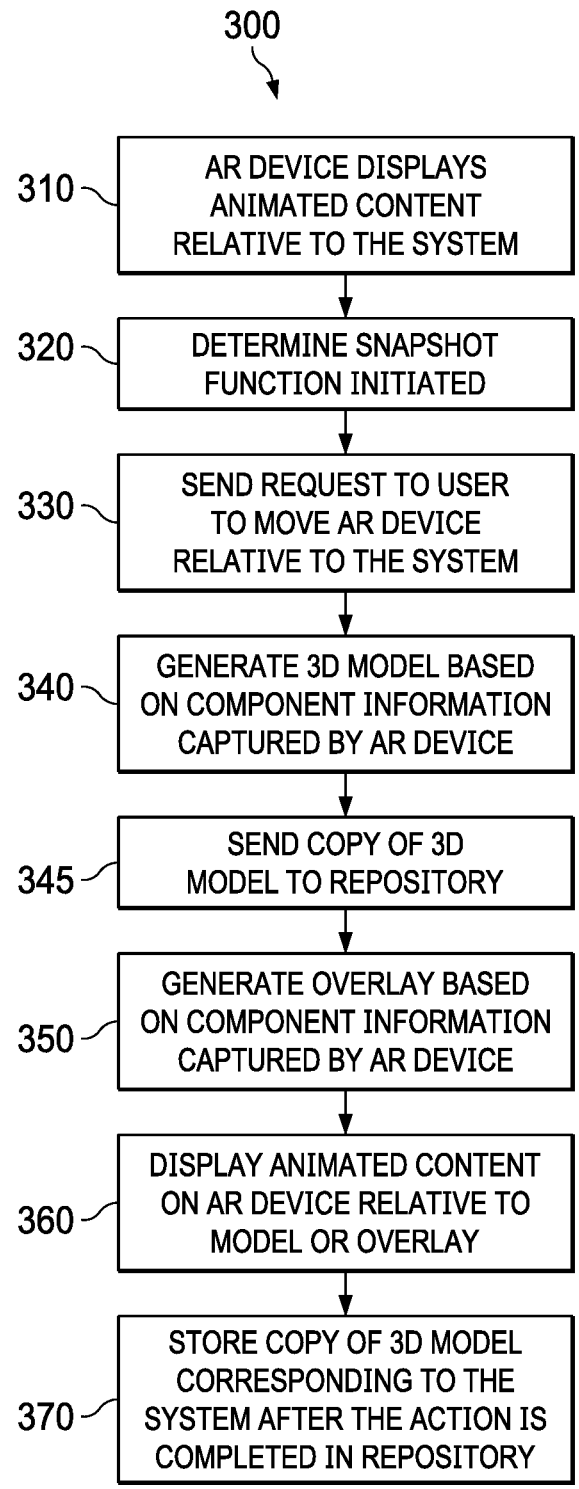
FIG. 3 shows a high level flow chart of a servicing operation.

FIG. 3 shows a high level flow chart of a servicing operation 300. More specifically, the servicing operation begins at step 310 by the augmented reality device displaying animated content relative to the system. At step 320, a snapshot function is initiated. In some embodiments, the snapshot function is initiated based on a process control module determining an action is complex or the user will need additional information. At step 330, the process control module sends a request to the user to move the augmented reality device around the system and sends instructions to the AR device to capture information about the state of the system. The request to move the AR device around the system includes information on any component that is associated with the action. In step 340, a 3D model is generated from the information captured by the AR device and in step 345 a copy of the 3D model is stored in the snapshot repository. In step 350, an overlay is generated based on the action. In step 360, the process control module sends instructions to display animated content relative to the 3D model or the overlay. Because the user is viewing a 3D model of the system, the user can zoom, pan, rotate or otherwise modify a view to better visualize the action to be completed. This helps the user understand more complex actions such as when components are partially obstructed or there is a preferred sequence for removal. In step 370, the process control module determines the action is completed and a copy of the 3D model that is corresponds to the system after the completed action is stored in the snapshot repository.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for servicing a system, comprising:
    displaying animated content relative to the system, the animated content comprising a set of animated content for installing, testing and removing components in the system;
    determining a snapshot function has been initiated, the snapshot function being initiated based upon a determination that a user needs additional information regarding the installing, testing and removing components;
    sending a request to a user of an augmented reality device with a camera to move the augmented reality device relative to the system;
    capturing information about components in the system and a configuration of the system;
    generating a three dimensional (3D) model of the system based on the captured information;
    displaying a composite view of the model or an overlay based on the model and animated content related to a component;
    determining when an action associated with the installing, testing and removing requires more time for the user to complete;
    pausing the animated content when the action associated with the installing, testing and removing requires more time for the user to complete;
    determining when the action associated with the installing, testing and removing components is completed; and
    storing a copy of the 3D model of the system reflecting completion of the action associated with the installing, testing and removing components in a snapshot repository, the snapshot repository storing a first copy of the 3D model of the system at a first state and a second copy of the 3D model of the system at a second state, the second state reflecting the completion of the action.

2. The method of claim 1, wherein:
the user initiates the snapshot function.

3. The method of claim 1, wherein:
a process control module initiates the snapshot function, the process control module monitoring a state of the system during a servicing operation and monitoring a position and orientation of the augmented reality device relative to the system.

4. The method of claim 1, wherein:
the 3D model is displayed based on a perspective of the user.

5. A system for displaying animated content comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
    displaying animated content relative to the system, the animated content comprising a set of animated content for installing, testing and removing components in the system;
    determining a snapshot function has been initiated, the snapshot function being initiated based upon a determination that a user needs additional information regarding the installing, testing and removing components;
    sending a request to a user of an augmented reality device with a camera to move the augmented reality device relative to the system;
    capturing information about components in the system and a configuration of the system;
    generating a three dimensional (3D) model of the system based on the captured information;
    displaying a composite view of the model or an overlay based on the model and animated content related to a component;
    determining when an action associated with the installing, testing and removing requires more time for the user to complete;
    pausing the animated content when the action associated with the installing, testing and removing requires more time for the user to complete;
    determining when the action associated with the installing, testing and removing components is completed; and
    storing a copy of the 3D model of the system reflecting completion of the action associated with the installing, testing and removing components in a snapshot repository, the snapshot repository storing a first copy of the 3D model of the system at a first state and a second copy of the 3D model of the system at a second state, the second state reflecting the completion of the action.

6. The system of claim 5, wherein:
the user initiates the snapshot function.

7. The system of claim 5, wherein:
a process control module initiates the snapshot function, the process control module monitoring a state of the system during a servicing operation and monitoring a position and orientation of the augmented reality device relative to the system.

8. The system of claim 5, wherein:
the 3D model is displayed based on a perspective of the user.

9. A non-transitory, computer-readable storage medium embodying computer program code, the computer program code comprising computer executable instructions configured for:
displaying animated content relative to the system, the animated content comprising a set of animated content for installing, testing and removing components in the system;
determining a snapshot function has been initiated, the snapshot function being initiated based upon a determination that a user needs additional information regarding the installing, testing and removing components;
sending a request to a user of an augmented reality device with a camera to move the augmented reality device relative to the system;
capturing information about components in the system and a configuration of the system;
generating a three dimensional (3D) model of the system based on the captured information;
displaying a composite view of the model or an overlay based on the model and animated content related to a component;
determining when an action associated with the installing, testing and removing requires more time for the user to complete;
pausing the animated content when the action associated with the installing, testing and removing requires more time for the user to complete;
determining when the action associated with the installing, testing and removing components is completed; and
storing a copy of the 3D model of the system reflecting completion of the action associated with the installing, testing and removing components in a snapshot repository, the snapshot repository storing a first copy of the 3D model of the system at a first state and a second copy of the 3D model of the system at a second state, the second state reflecting the completion of the action.

10. The non-transitory, computer-readable storage medium of claim 9, wherein:
the user initiates the snapshot function.

11. The non-transitory, computer-readable storage medium of claim 9, wherein:
a process control module initiates the snapshot function, the process control module monitoring a state of the system during a servicing operation and monitoring a position and orientation of the augmented reality device relative to the system.

12. The non-transitory, computer-readable storage medium of claim 9, wherein:
the 3D model is displayed based on a perspective of the user.

* * * * *